United States Patent
Guo et al.

(10) Patent No.: US 10,895,661 B2
(45) Date of Patent: Jan. 19, 2021

(54) DETERMINATION OF NEAR WELLBORE PROPERTIES USING NATURAL GAMMA RAYS

(71) Applicant: Halliburton Energy Services, Inc., Houston, TX (US)

(72) Inventors: Qingzhen Guo, Houston, TX (US); Dongwon Lee, Kingwood, TX (US); Weijun Guo, Houston, TX (US); Daniel F. Dorffer, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 355 days.

(21) Appl. No.: 15/747,578

(22) PCT Filed: Aug. 24, 2016

(86) PCT No.: PCT/US2016/048424
§ 371 (c)(1),
(2) Date: Jan. 25, 2018

(87) PCT Pub. No.: WO2017/040149
PCT Pub. Date: Mar. 9, 2017

(65) Prior Publication Data
US 2018/0210109 A1    Jul. 26, 2018

Related U.S. Application Data

(60) Provisional application No. 62/211,115, filed on Aug. 28, 2015.

(51) Int. Cl.
*G01V 5/04* (2006.01)
*G01V 5/06* (2006.01)
(Continued)

(52) U.S. Cl.
CPC ............ *G01V 5/045* (2013.01); *E21B 47/085* (2020.05); *E21B 49/08* (2013.01); *G01N 9/24* (2013.01); *G01V 5/06* (2013.01); *E21B 49/0875* (2020.05)

(58) Field of Classification Search
CPC .... E21B 47/085; E21B 49/08; E21B 49/0875; G01V 5/045; G01V 5/06; G01N 9/24
See application file for complete search history.

(56) References Cited

U.S. PATENT DOCUMENTS

| | | | |
|---|---|---|---|
| 4,527,058 A | 7/1985 | Smith, Jr. | |
| 5,272,336 A * | 12/1993 | Moake | G01V 5/04 250/261 |
| 2003/0101011 A1 * | 5/2003 | Odom | G01N 9/24 702/78 |

OTHER PUBLICATIONS

PCT Application Serial No. PCT/US2016/048424, International Search Report, dated Nov. 28, 2016, 3 pages.
(Continued)

*Primary Examiner* — Marcus H Taningco
(74) *Attorney, Agent, or Firm* — Gilliam IP PLLC

(57) ABSTRACT

Various apparatus or methods are arranged to operate a tool downhole in a well, where the tool has a detection package operable to detect gamma rays. Deviation of energy spectra of detected gamma rays in each selected energy window of a set of selected energy windows with respect to reference energy spectra of the respective selected energy window can be detected. One or more properties of one or more regions around the tool can be determined from the deviations, the regions being between the tool and a source of the detected gamma rays in a formation around the well. Additional apparatus, systems, and methods having a gamma ray detection package can operate in a variety of applications.

20 Claims, 8 Drawing Sheets

(51) Int. Cl.
*E21B 47/085* (2012.01)
*E21B 49/08* (2006.01)
*G01N 9/24* (2006.01)

(56) References Cited

OTHER PUBLICATIONS

PCT Application Serial No. PCT/US2016/048424, International Written Opinion, dated Nov. 29, 2016, 10 pages.

\* cited by examiner

DETERMINATION OF NEAR WELLBORE PROPERTIES USING NATURAL GAMMA RAYS

PRIORITY APPLICATION

This application claims the benefit of U.S. Provisional Application Ser. No. 62/211,115, filed on 28 Aug. 2015, which application is incorporated by reference herein in its entirety.

TECHNICAL FIELD

The present invention relates generally to apparatus and methods of making and evaluating measurements related to oil and gas exploration.

BACKGROUND

In drilling wells for oil and gas exploration, understanding the structure and properties of the associated geological formation provides information to aid such exploration. A number of different measurements in a borehole can be performed to attain this understanding. Further, the usefulness, efficiency, and accuracy of traditional measurements may be related to the precision or quality of the techniques to attain and process data derived from such measurements. Techniques and apparatus to simplify measurements, to enhance processing of measured data, to enhance analysis of data from measurements to provide properties of a formation or a borehole, or to provide combinations thereof can further aid in drilling operations.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, methods and systems can be operated to utilize the deviation of energy spectra of detected gamma rays in selected energy windows to determine the densities of borehole fluid and annular space. Gamma rays are electromagnetic radiation from radioactive decay of atomic nuclei. Gamma rays emitted from the formation are attenuated by the materials between the formation and detector disposed downhole. The measured spectra in tool detectors can be correlated to the densities of the borehole fluid and annular space. Thus, the densities of the borehole fluid and annular space can be deduced by the change of the spectra.

Such an arrangement of a measurement system and operating procedure can provide in situ real time fluid density information in the well under investigation. No extra detector and tool design in addition to conventional spectroscopy gamma ray detection systems is required for the measurement system and operating procedure. Regular natural gamma ray spectra can be used with this technique to predict the fluid density and annular space density. A straightforward algorithm can be used to determine the densities of the borehole fluid and annular space.

Figure 1:
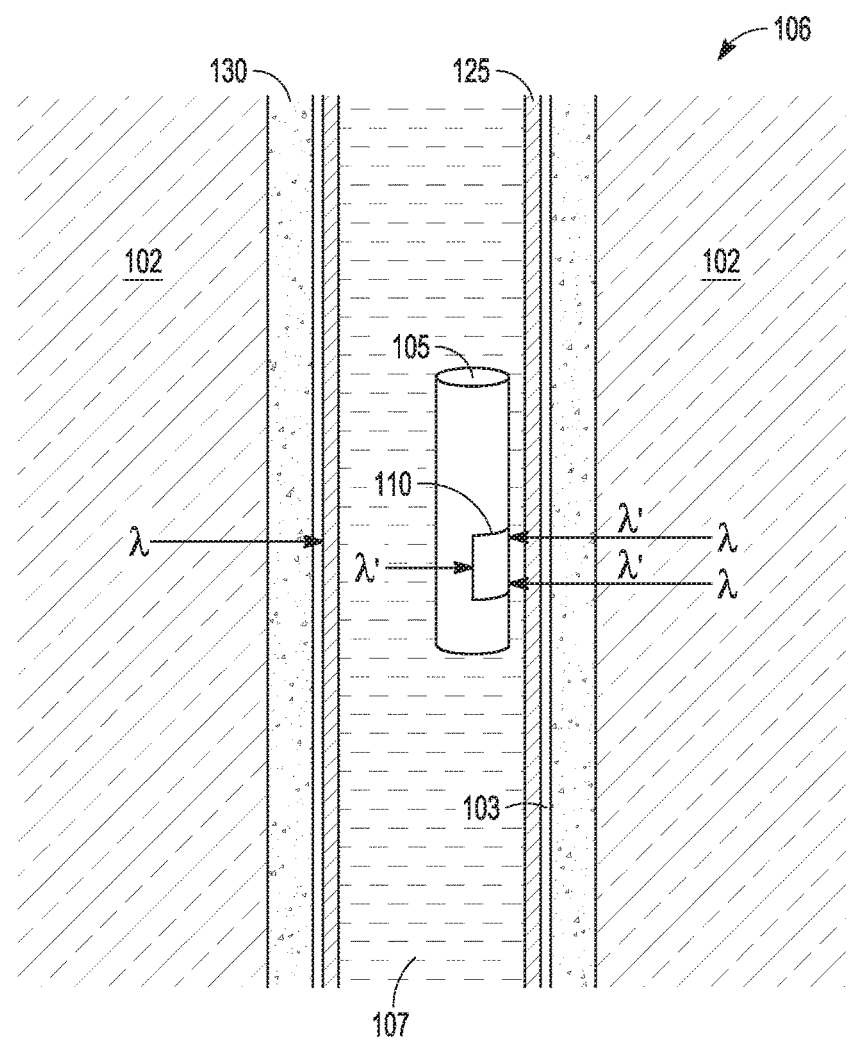
FIG. 1 is an illustration of an apparatus having a tool that can be applied in a well surrounded by borehole fluid, casing, cement and formation, in accordance with various embodiments.

Photoelectric absorption occurs for gamma ray, especially below 511 keV when high-Z material like barite is in the borehole or annular space. This photoelectric absorption effect suppresses the observed spectrum, leading to the deviation between the spectrum and a reference spectra below 511 keV. FIG. 1 is a representation describing emitted photons from a formation going through and being attenuated by the formation, cement, casing steel, and borehole fluid. For operating in such a well site associated with the borehole surrounded by the formation, it is important to know the densities of the borehole fluid and the materials in the annular space. Herein, methods and systems are taught to determine near wellbore properties using a natural spectral gamma ray log.

In various embodiments, systems and method can include, but are not limited to, an apparatus with a component having a gamma ray sensor package that is able to record spectra information of incoming photons. The gamma ray sensor package can be, but is not limited to, a gamma ray scintillator coupled with a photomultiplier tube (PMT), a photodiode, or other device that converts photons to an electrical signal. The gamma ray scintillator produces scintillation lights in response to interacting with incident photons, while the PMT produces an electrical signal in response to scintillation lights or photons. The coupling of the scintillator and PMT enhances the light transmission in between them. The gamma ray sensor package may be a semiconductor detector that produces an electrical signal in response to the deposited energy of incoming photons. This semiconductor device has the potential to reach higher energy resolution and provides more accurate spectra.

Figure 10:
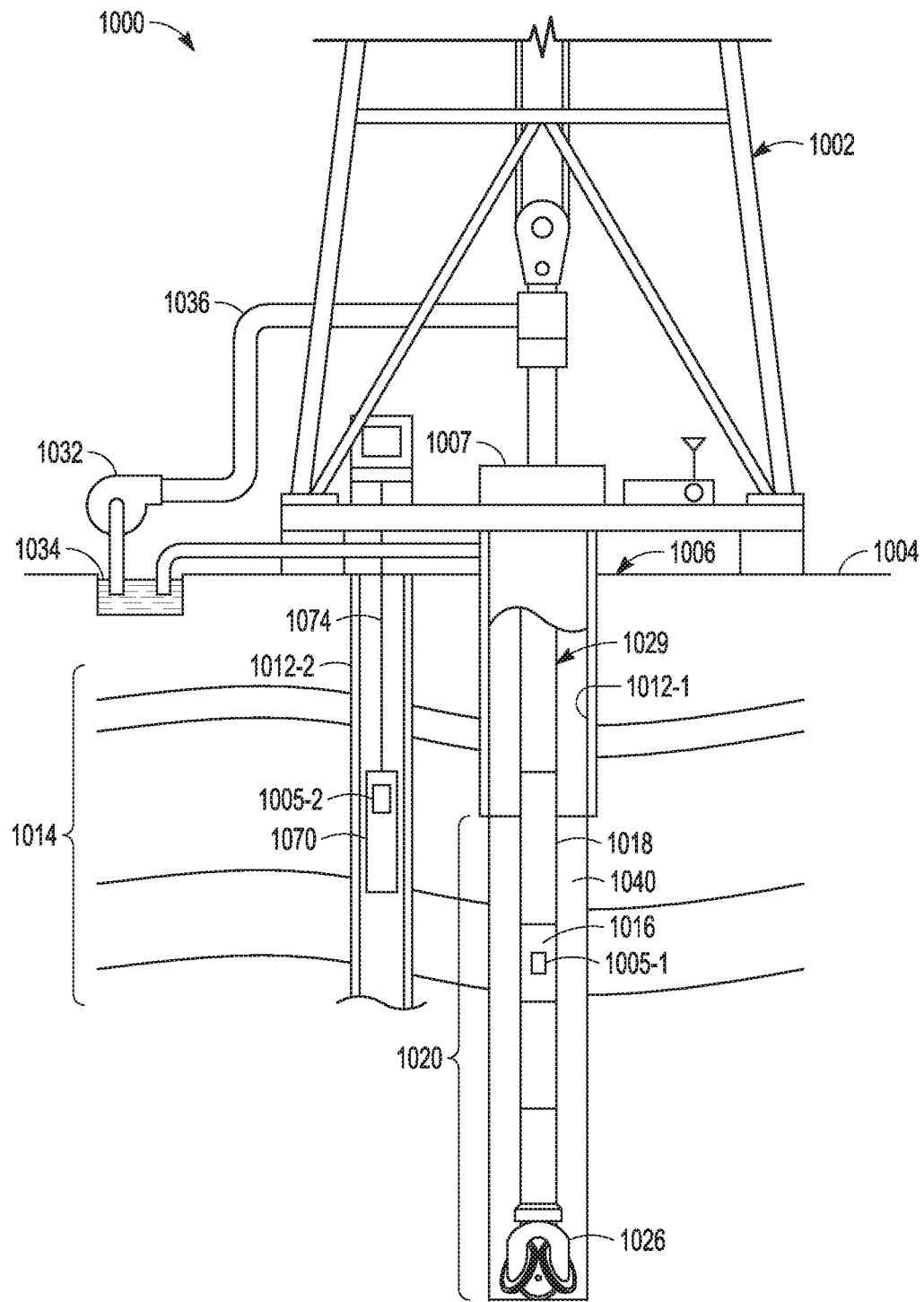
FIG. 10 is an example system at a well site, where the system is operable with a detector package, in accordance with various embodiments.

FIG. 1 is an illustration of an apparatus having a tool 105 that can be applied in a well surrounded by borehole fluid, casing, cement and formation, in accordance with various embodiments. The tool 105, having a gamma ray detector 110, is disposed in a borehole 106 surrounded by a formation 102. The tool 105 can be disposed in the borehole 106 by a number of different arrangements such as, but not limited to, in a wireline arrangement, a slickline arrangement, a logging-while-drilling (LWD) arrangement or other conveyance arrangement such as coiled tubing, drill pipe, downhole tractor, or the like. Examples of such conveyance mechanisms are shown in FIG. 10. The tool 105 can be disposed in the borehole 106 with one or more of a casing 125, cement 130, borehole fluid 107, and annular space 103 between the gamma ray detector 110 and sources of natural gamma rays in the formation 102, represented in FIG. 1 by λ, where attenuation the natural gammas rays, as discussed above, is represent by λ'. Tool 105 in conjunction with a processor can be used to derive, but is not limited to, borehole fluid density and annular space density. The processor can be disposed on the surface, can be integrated with the tool 105, or both (e.g. via distributed or stage processing).

Gamma spectroscopy detectors typically are passive devices responsive to gamma interaction occurring in a volume of the detector. Interaction mechanisms include the photoelectric effect, the Compton effect, and pair production. For detection, the photoelectric effect is generally the interaction mechanism for which a device is generally arranged, as it absorbs all of the energy of the incident gamma ray. Full energy absorption is also possible when a series of these interaction mechanisms take place within the detector volume. A voltage pulse produced by a detector, such as a photomultiplier in a scintillation counter, can be shaped by a multichannel analyzer (MCA). The MCA is a circuit that is capable of setting up a large number of individual windows to look at a complete spectrum in one pass. The MCA can operate on a small voltage signal produced by the detector, reshape it, and convert that signal into a digital signal. In some systems, the analog-to-digital conversion is performed before the peak is reshaped. The analog-to-digital converter (ADC) can also sort the voltage pulses produced by the detector by their amplitude height, where the ADC may have a specific numbers of bins into which the pulses can be sorted. These bins can represent the channels in the spectrum of the received gamma rays. The number of channels implemented may be in range from a relatively small number of channels to a large number of channels such as from 256 channels to more than 1024 channels. For example, a MCA may consist of 1024 individual channels/windows, where a processing system can acquire data simultaneously from each window and display it as an energy spectrum. The processing system can be located downhole, at the surface, or split between the two, i.e. distributed processing. The processing system can include procedures that allow manipulation of the resultant data in a variety of ways. Such a processing system can include one or more processors and one of more memory devices. An example of an arrangement of such a processing system is shown in FIG. 2.

Figure 2:
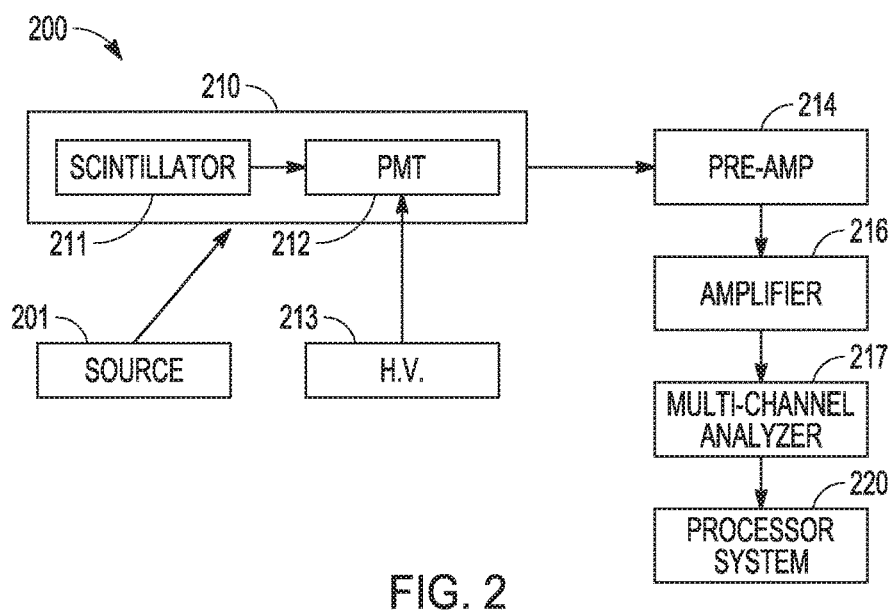
FIG. 2 is a block of an example system operable to make measurements of gamma rays and process signals from the measurements, in accordance with various embodiments.

FIG. 2 is a block of an embodiment of an example system 200 operable to make measurements of gamma rays and process signals from the measurements. Other systems may be used in accordance with the teachings herein. The system 200 can include a gamma ray detector 210 having a scintillator 211 coupled with a PMT 212 arranged to receive gamma ray from a source 201. The system 200 can include a high voltage source (H.V.) 213 to drive the PMT 212. The scintillator 211 may be in the form of a crystal. The gamma ray detector 210 may be realized as another arrangement of components to detect gamma rays and convert the gamma rays to an electrical signal. The gamma ray detector 210 may be arranged in a borehole as a gamma ray sensor similar or identical the arrangement of the gamma ray detector 110 of FIG. 1.

The output of gamma ray detector 210 can be provided to a pre-amp 214 that outputs a signal to an amplifier 216 in response to an electrical signal provided by the gamma ray detector 210. In response to the signal received from the pre-amp 214, the amplifier 216 provides a signal to a MCA 217, which, in response, outputs a signal to a processor system 220. The processor system 220 can process a received signal to determine various properties or characteristics from the gamma rays received by the gamma ray detector 210. The processor system 220 may include one or more processors and one or more memory devices to operate on data associated with the gamma rays received by the gamma ray detector 210.

Figure 3:
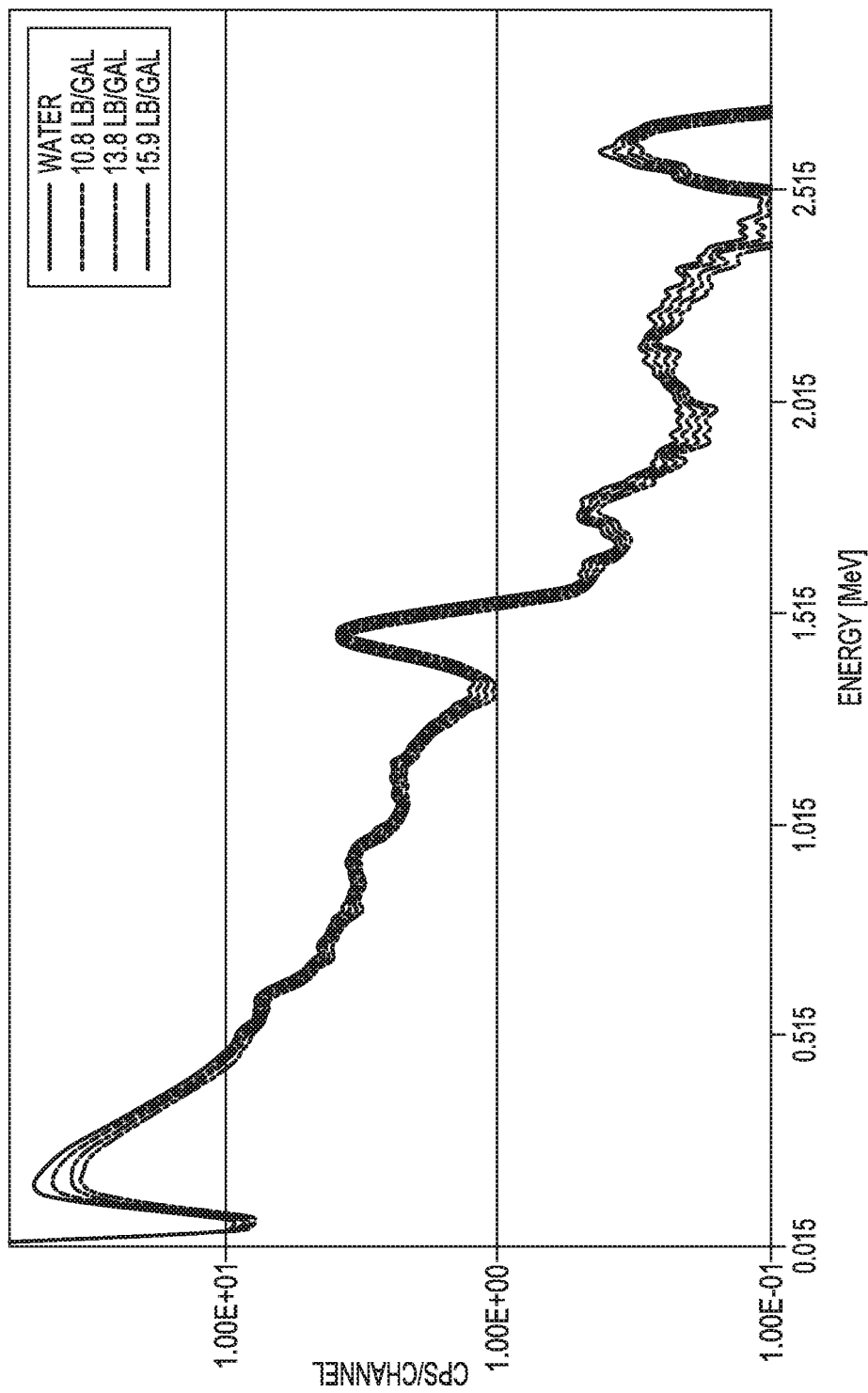
FIG. 3 is a set of plots of counts per second per channel versus energy for gamma ray spectra measured in the same borehole but with different borehole fluid, in accordance with various embodiments.

Consider the measurement of borehole fluid density. It's important to collect the in situ real time borehole fluid density information as the composition of the borehole fluid can vary over time. The real time borehole fluid density may ensure the calculated normalized borehole gamma ray signal for each measurement is as accurate as possible. For a given detector and borehole geometry, the attenuation of incoming photons depends on the borehole fluid density, leading to the deviation of the spectra as shown in FIG. 3. FIG. 3 is a set of plots of counts per second per channel (CPS/channel) versus energy for gamma ray spectra measured in the same borehole but with different borehole fluid: water, 10.8, 13.8 and 15.9 lb/gal. The spectra in window A are separated due to photoelectric absorption.

The heavier the borehole fluid, the lower the spectrum is, especially in the low energy Compton peak window, which is referred to as Window A, covering from 115 keV to 299 keV. Window B covers from 299 keV to 2.94 MeV. Each selected energy window can contain several energy bins (channels). Spectrum measured in fresh water filled borehole may be taken as reference spectrum. The term $C_a$ represents the sum of counting rates in Window A, while $C_b$ is the sum of counting rates in Window B. $C_{water\_a}$ and $C_{water\_b}$ stand for the sums of counting rates of reference spectra in Window A and B, respectively. The sum of the counting rates in each energy bin of one energy window is included in the "sum of counting rates." The term R represents the ratio of the counting rates to those of the reference spectrum in each window:

$$R = \frac{C_{mud}}{C_{water}}. \tag{1}$$

A borehole fluid density index can be expressed in terms of, but not limited to $$D_{index} = (R_a - R_b) \times 100 = \left( \frac{C_{mud_a}}{C_{water_a}} - \frac{C_{mud_b}}{C_{water_b}} \right) \times 100. \tag{2}$$

Other indexes may be generated. A relationship between the other indexes and borehole fluid density, or other downhole properties, can be generated by experiment and/or simulation.

Figure 4:
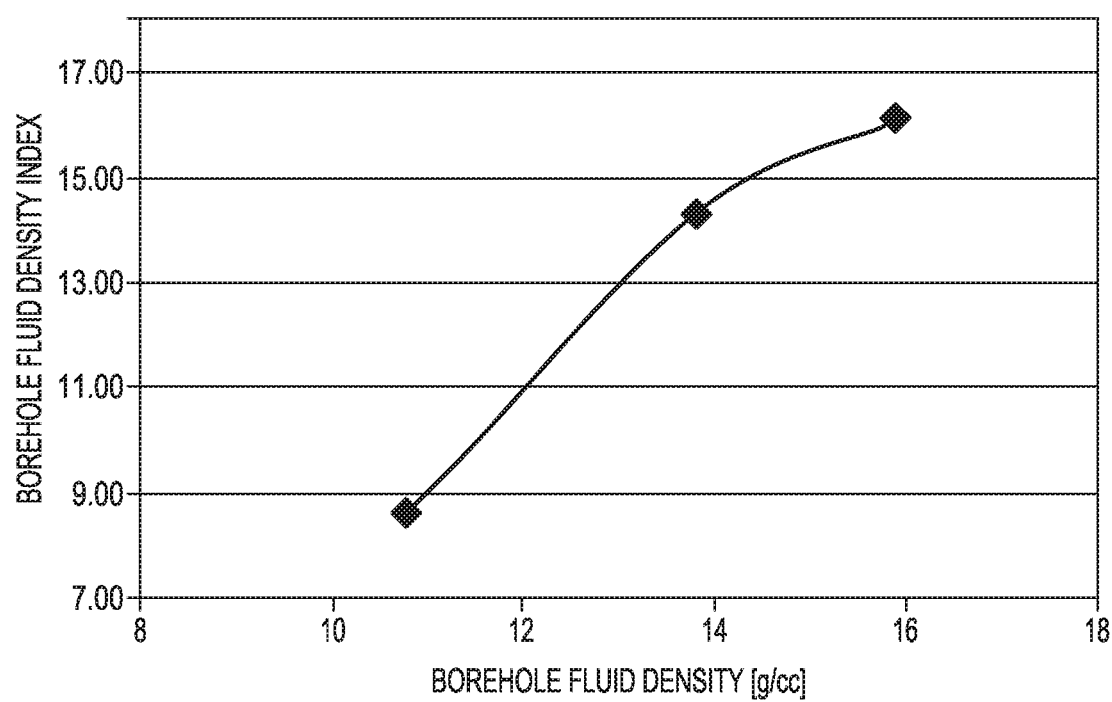
FIG. 4 is a plot showing a relationship between borehole fluid density and a borehole fluid density index, in accordance with various embodiments.

FIG. 4 is a plot showing a relationship between borehole fluid density and the above borehole fluid density index. A spectral gamma ray measurement in the fluid filled borehole together with the reference spectrum (water filled borehole) provides the index value. The density of the borehole fluid can be deduced based on this correlation function. More data points with various borehole fluids can lead to a well calibrated correlation function. This relationship can be pre-engineered prior to measurement runs. The pre-engineering may be conducted by experiments or simulated to generate the relationship that is subsequently used in operational measurements. This pre-determined relationship can be stored in a memory device, such as but not limited to, a database.

Consider density in an annular space. In a cased well, depths and densities of cement, barite, and water in the annular space are of great interest. The difference of the densities between cement, barite, and water cause different attenuation of the incoming gamma rays by photoelectric absorption, leading to the deviation of the spectra, especially below 511 keV, as shown in FIG. 5.

Figure 5:
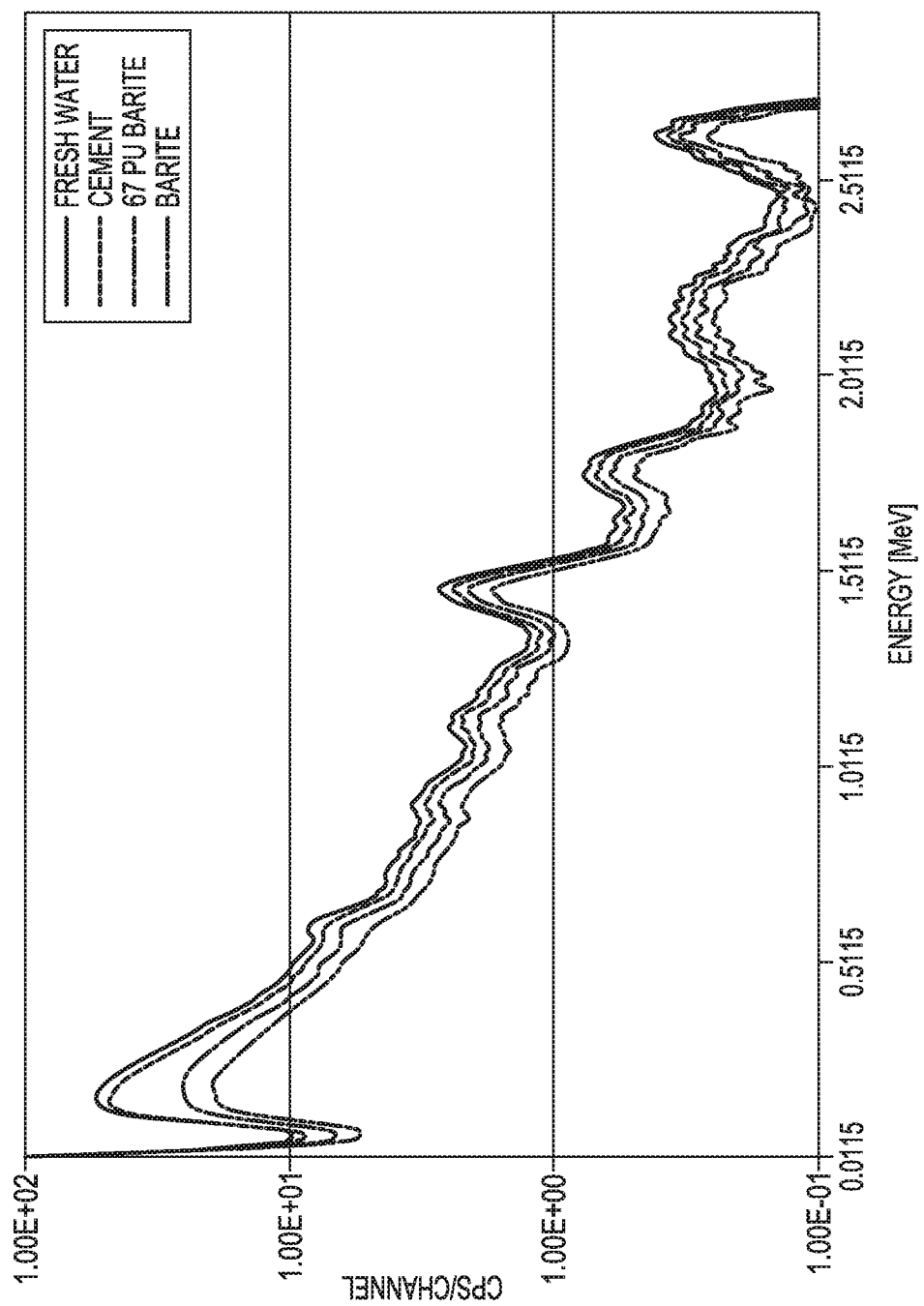
FIG. 5 is a set of plots showing gamma ray spectra measured with the same tool in the same borehole size and fluid, but with different materials in the annular space outside the casing, in accordance with various embodiments.
Figure 6:
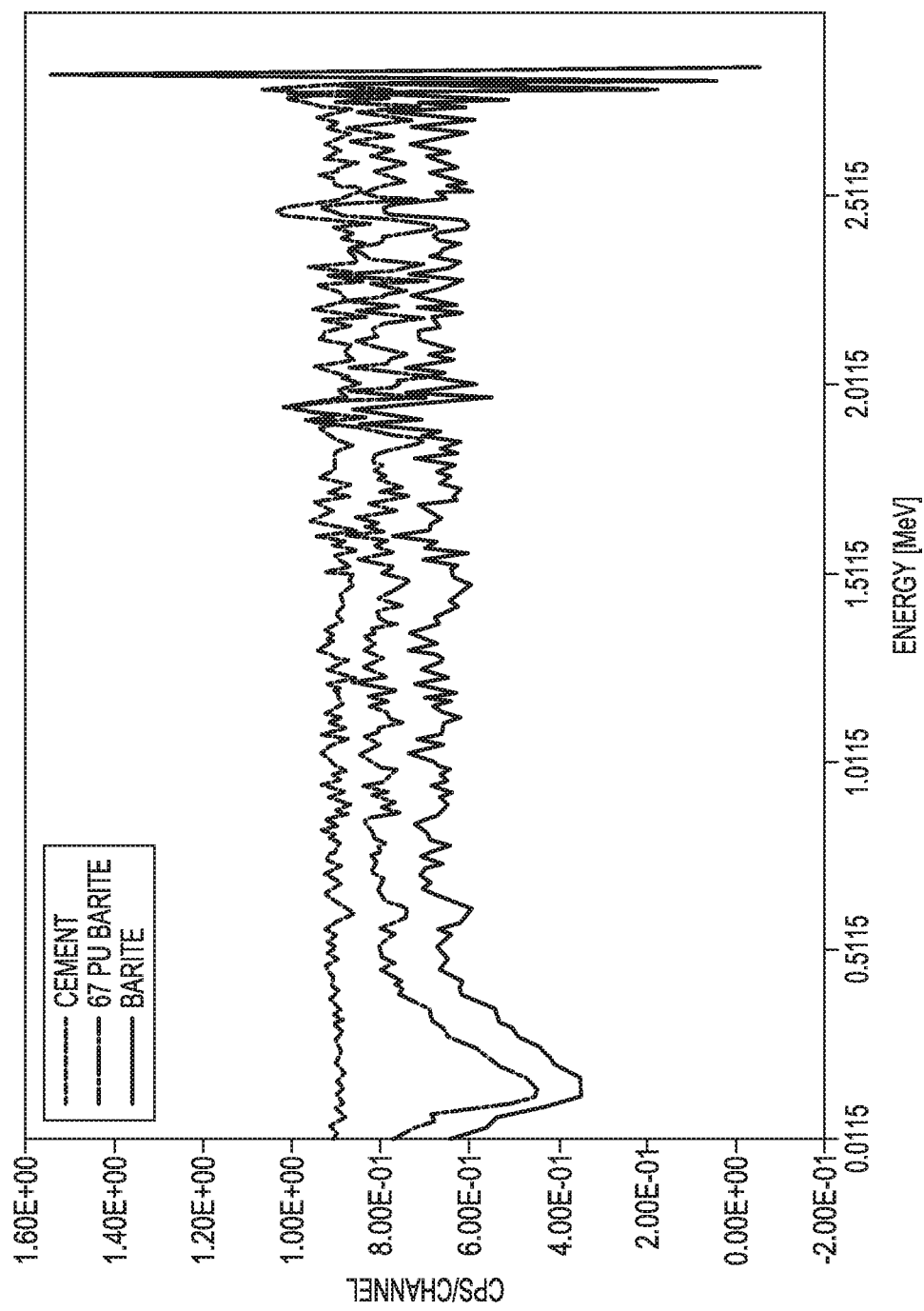
FIG. 6 is a set of plots of spectral ratio of the cement/barite spectra and reference spectrum from FIG. 5, channel by channel, in accordance with various embodiments.

FIG. 5 is a set of plots showing gamma ray spectra measured with the same tool in the same borehole size and fluid, but with different materials in the annular space outside the casing: water, cement, 67 pu barite, and barite. Spectrum of the case with fresh water filled in the annular space may be taken as the reference spectrum. The other spectra can be normalized by this reference spectrum. FIG. 6 is a set of plots of spectral ratio of the cement/barite spectra and reference spectrum from FIG. 5, channel by channel. The normalization was obtained by dividing the spectra by the counting rates of reference spectrum channel by channel.

Window M can be defined as covering from 115 keV to 506 keV, and window N be defined as covering from 506 keV to 2.84 MeV. $C_m$ and $C_n$ represent the sum of the normalized spectra in Window M and N. The term R stands for the ratio of normalized counting rates in windows M and N.

$$R_{mn} = \frac{C_m}{C_n}. \quad (3)$$

The annular space density index can be expressed as, but not limited to:

$$I_{index} = R_{mn} \times 100 = \frac{C_m}{C_n} \times 100. \quad (4)$$

Figure 7:
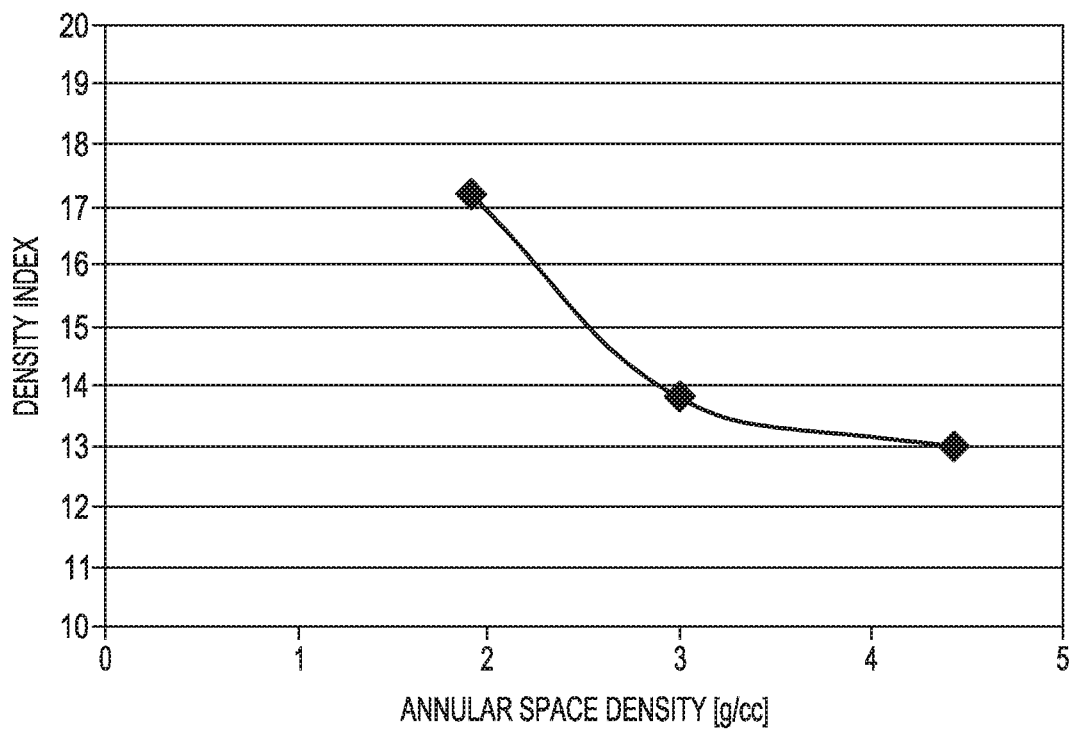
FIG. 7 is a plot showing a relationship between annular space density and an index, in accordance with various embodiments.

FIG. 7 is a plot showing a relationship between the annular space density and the index defined in equation (4). The relationship between annular space density and the index is described in FIG. 7. Spectral gamma ray measurements in the borehole provide the index value, which can be used to deduce the annular space density based on this correlation function. Other indexes may be generated. A relationship between the other indexes and borehole fluid density, or other downhole properties, can be generated by experiment and/or simulation. More data points with various borehole fluids will lead to a well calibrated correlation function.

Figure 8:
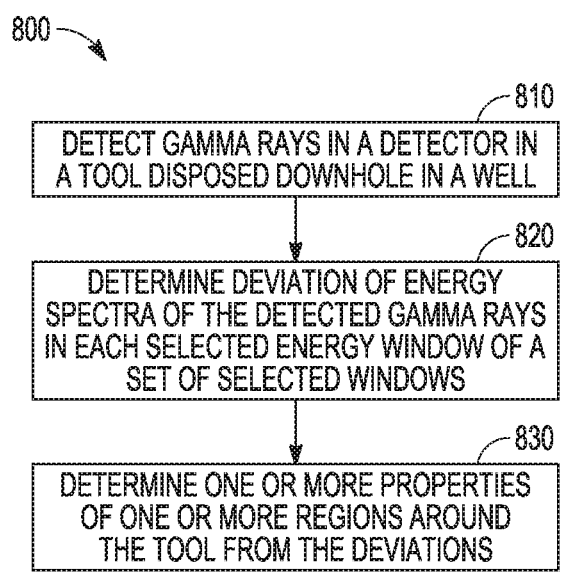
FIG. 8 is a flow diagram of features of an example method of operating a detection package to determine near wellbore properties using natural gamma rays, in accordance with various embodiments.

FIG. 8 is a flow diagram of features of an embodiment of an example method 800 of operating a detection package to determine near wellbore properties using natural gamma rays. At 810, detect gamma rays are detected in a detector in a tool disposed downhole in a well. At 820, deviation of energy spectra of the detected gamma rays in each selected energy window of a set of selected energy windows is determined. The deviation can be determined with respect to reference energy spectra of the respective selected energy window. The reference energy spectra can be energy spectra measured in fresh water-filled borehole. Determining deviation of energy spectra can include determining differences between energy spectra of the detected gamma rays in two different energy windows.

At 830, one or more properties of one or more regions around the tool are determined from the deviations. The regions are between the tool and a source of the detected gamma rays in a formation around the well. Determining one or more properties can include using a relationship between the energy spectra in different energy windows. The energy spectra in the different energy windows can be normalized by the reference energy spectra channel by channel. Determining one or more properties can include determining borehole fluid density and/or annular space density. Determining one or more properties can include determining borehole fluid density using an index correlated to difference of normalized counting rates in different energy windows. Determining one or more properties can include determining annular space density using an index correlated to a ratio of normalized counting rates in different energy windows.

A system can comprise a tool having a detector to detect gamma rays, the tool operable downhole in a well; and a processor arranged to determine deviation of energy spectra of gamma rays detected in downhole operation of the tool in each selected energy window of a set of selected energy windows with respect to a reference energy spectra of the respective selected energy window and to determine one or more properties of one or more regions around the tool, when disposed downhole in the well, from the deviations, the regions being between the tool and a source of the detected gamma rays in a formation around the well. Such a system can perform operations associated with method 800.

In various embodiments, a machine-readable storage device can comprise instructions stored thereon, which, when performed by a machine, cause the machine to perform operations, the operations comprising one or more features similar to or identical to features of methods and techniques described with respect to method 800, variations thereof, and/or features of other methods taught herein. The physical structures of such instructions may be operated on by one or more processors.

Executing these physical structures can cause the machine to perform operations, the operations comprising: detecting gamma rays in a detector in a tool, the tool disposed downhole in a well; determining, via a processor, deviation of energy spectra of the detected gamma rays in each selected energy window of a set of selected energy windows with respect to a reference energy spectra of the respective selected energy window; and determining, via the processor, one or more properties of one or more regions around the tool from the deviations, the regions being between the tool and a source of the detected gamma rays in a formation around the well.

Executing the instructions can include a number of additional features. Determining deviation of energy spectra can include determining differences between energy spectra of the detected gamma rays in two different energy windows. Determining one or more properties can include using a relationship between the energy spectra in different energy windows. The energy spectra in the different energy windows can be normalized by the reference energy spectra channel by channel. The reference energy spectra can be energy spectra measured in fresh water-filled borehole. Determining one or more properties can include determining borehole fluid density and annular space density. Determining one or more properties can include determining borehole fluid density using an index correlated to difference of normalized counting rates in different energy windows. Determining one or more properties can include determining annular space density using an index correlated to a ratio of normalized counting rates in different energy windows.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 930 of FIG. 9. While memory module 930 is shown as a single unit, terms such as "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 9:
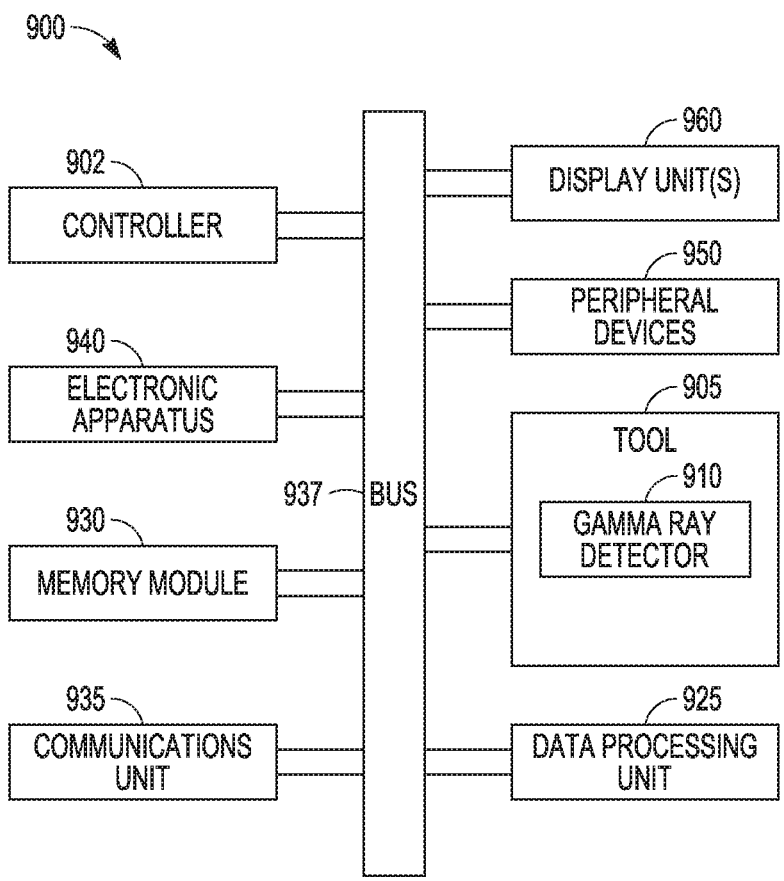
FIG. 9 is a block diagram of features of an example system operable with a detector package, in accordance with various embodiments.

FIG. 9 depicts a block diagram of an embodiment of features of an example system 900 operable with detection packages, as described herein or in a similar manner. The system 900 can include a tool 905 having a gamma ray detector 910 and a controller 902 that can be realized in a similar or identical manner to arrangements and processing discussed herein.

The system 900 can include a memory module 930, an electronic apparatus 940, and a communications unit 935. The memory module 930 can be structured to include a database. The controller 902, the memory module 930, and the communications unit 935 can be arranged to operate as a processing unit to control operation of the tool 905 and to perform operations on the signals collected by the gamma ray detector 910 to conduct evaluations of an entity under investigation. A data processing unit 925, structured to conduct evaluation of an entity under investigation using one or more detection packages, can be implemented as a single unit or distributed among the components of the system 900 including electronic apparatus 940. The electronic apparatus 940 can provide other circuitry for operation of the system 900. The controller 902 and the memory module 930 can operate to control use of the tool 905 and to manage processing schemes associated with detection signals provided from the gamma ray detector 910. The gamma ray detector 910 and the controller 902 can be configured, for example, to operate similar to or identical to the components discussed herein or similar to or identical to any of methods discussed herein.

The communications unit 935 may include downhole communications for appropriately located sensors in a drilling operation. Such downhole communications can include a telemetry system. The communications unit 935 may use combinations of wired communication technologies and wireless technologies at frequencies that do not interfere with on-going measurements.

The system 900 can also include a bus 937, where the bus 937 provides electrical conductivity among the components of the system 900. The bus 937 can include an address bus, a data bus, and a control bus, each independently configured or in an integrated format. The bus 937 can be realized using a number of different communication mediums that allows for the distribution of components of the system 900. The bus 937 can include a network. Use of the bus 937 can be regulated by the controller 902.

In various embodiments, the peripheral devices 950 can include additional storage memory and other control devices that may) operate in conjunction with the controller 902 and the memory module 930. In an embodiment, the controller 902 can be realized as a processor or a group of processors that may operate independently depending on an assigned function.

The system 900 can include display unit(s) 960 as a distributed component that may be located remote from the entity under investigation using the tool 905, where the display unit(s) 960 can be used with instructions stored in the memory module 930 to implement a user interface to monitor the operation of the tool 905 or components distributed within the system 900. The user interface may be used to input parameter values for thresholds such that the system 900 can operate autonomously substantially without user intervention in a variety of applications. The user interface can also provide for manual override and change of control of the system 900 to a user. Such a user interface can be operated in conjunction with the communications unit 935 and the bus 937.

FIG. 10 depicts an example system 1000 at a drilling site, where the system is operable with detection packages, as described herein or in a similar manner. The system 1000 can include a tool 1005-1, 1005-2, or both 1005-1 and 1005-2 to conduct measurements and analysis using one or more detection packages as taught herein. Tools 1005-1 and 1005-2 can be realized in a similar or identical manner to arrangements taught herein.

System 1000 can include a drilling rig 1002 located at a surface 1004 of a well 1006 and a string of drill pipes, that is, drill string 1029, connected together so as to form a drilling string that is lowered through a rotary table 1007 into a wellbore or borehole 1012-1. Drilling rig 1002 can provide support for drill string 1029. Drill string 1029 can operate to penetrate rotary table 1007 for drilling the borehole 1012-1 through subsurface formations 1014. Drill string 1029 can include drill pipe 1018 and a bottom hole assembly 1020 located at the lower portion of drill pipe 1018.

The bottom hole assembly 1020 can include a drill collar 1016 and a drill bit 1026. Drill bit 1026 can operate to create borehole 1012-1 by penetrating the surface 1004 and the subsurface formations 1014. Bottom hole assembly 1020 can include tool 1005-1 attached to drill collar 1016 to perform measurements to conduct formation evaluation. Tool 1005-1 can be structured for an implementation in a measure-while-drilling (MWD) system such as a LWD system. The housing containing tool 1005-1 can include electronics to control tool 1005-1 and collect responses from a gamma ray detector(s) of tool 1005-1. Such electronics may include a processing unit to provide analysis of the formation to the surface over a standard communication mechanism for operating in a well. Alternatively, electronics can include a communications interface to provide signals output by gamma ray detector(s) of tool 1005-1 to the surface over a standard communication mechanism for operating in a well, where these output signals can be analyzed at a processing unit at the surface.

During drilling operations, drill string 1029 can be rotated by rotary table 1007. In addition to, or alternatively, the bottom hole assembly 1020 can also be rotated by a motor (e.g., a mud motor) that is located downhole. Drill collars 1016 can be used to add weight to drill bit 1026. Drill collars 1016 also can stiffen the bottom hole assembly 1020 to allow the bottom hole assembly 1020 to transfer the added weight to drill bit 1026, and in turn, assist drill bit 1026 in penetrating surface 1004 and subsurface formations 1014.

During drilling operations, a mud pump 1032 can pump drilling fluid (sometimes known by those of skill in the art as "drilling mud") from a mud pit 1034 through a hose 1036 into drill pipe 1018 and down to drill bit 1026. The drilling fluid can flow out from drill bit 1026 and be returned to the surface 1004 through an annular area 1040 between drill pipe 1018 and the sides of the borehole 1012-1. The drilling fluid may then be returned to mud pit 1034, where such fluid is filtered. In some embodiments, the drilling fluid can be used to cool drill bit 1026, as well as to provide lubrication for drill bit 1026 during drilling operations. Additionally, the drilling fluid may be used to remove subsurface formation 1014 cuttings created by operating drill bit 1026.

In various embodiments, tool 1005-2 may be included in a tool body 1070 coupled to a logging cable 1074 such as, for example, for wireline applications. The tool body 1070 containing the tool 1005-2 can include electronics to control tool 1005-2 and collect responses from gamma ray detector(s) of tool 1005-2. Such electronics can include a processing unit to provide analysis of the formation to the surface over a standard communication mechanism for operating in a well. Alternatively, electronics can include a communications interface to provide signals output by gamma ray detector(s) of tool 1005-2 to the surface over a standard communication mechanism for operating in a well, where these output signals can be analyzed at a processing unit at the surface. The logging cable 1074 may be realized as a wireline (multiple power and communication lines), a mono-cable (a single conductor), and/or a slick-line (no conductors for power or communications), or other appropriate structure such as coiled tubing, drill pipe, downhole tractor, or the like for use in the borehole 1012-2. Though, for convenience, FIG. 10 depicts both an arrangement for wireline applications and an arrangement for LWD applications, the system 1000 may be also realized for one of the two applications.

Techniques, as taught herein, employ a nuclear method and system, utilizing the deviation of spectra caused by the attenuation of gamma ray by the borehole fluid and annular space, to derive near wellbore properties. For instance, such deviation caused from attenuation of gamma ray by the borehole fluid and annular space can be utilized to derive near wellbore density properties. Systems and methods, as taught herein, are capable of measuring real time mud density in the borehole and the annular space density during natural spectral gamma ray logging process. Such methods are able to determine the densities of borehole fluid and annular space and provide useful information, such as fluid density and depths of cement, barite and water, for environmental correction algorithm.

In various embodiments, nuclear methods and systems are provided to deduce the densities of borehole fluid and annular space utilizing the deviation of gamma ray spectra in a selected energy window due to photoelectric absorption occurring for gamma ray energy below 511 keV when high-Z material like barite exists in the borehole or annular space. The ratio of the spectra deviation in selected energy window carries information of the density properties of near wellbore materials and can be used to estimate the borehole fluid density and to identify the annular space material properties: the densities and depths of cement, barite and water. Such nuclear methods and systems can provide the real time fluid density in the borehole.

Use of deviation of spectra due to the attenuation of gamma rays by borehole fluid and annular space to determine borehole fluid density and annular space density can provide an important input to borehole correction. No extra detector and tool design to conventional sensing tools are is required for methods and systems as taught herein. Regular natural gamma ray logging spectra can be used with methods and systems as taught herein to provide useful information such as to estimate the fluid density and depths of cement, barite and water, and annular space density. Regular natural gamma ray logging spectra can be used with such methods and systems to develop environmental correction algorithms and can be used to predict in situ real time mud density in the borehole.

The following are example embodiments of methods, machine readable storage devices, and systems in accordance with the teachings herein.

A method 1 can comprise: detecting gamma rays in a detector in a tool, the tool disposed downhole in a well; determining, via a processor, deviation of energy spectra of the detected gamma rays in each selected energy window of a set of selected energy windows with respect to a reference energy spectra of the respective selected energy window; and determining, via the processor, one or more properties of one or more regions around the tool from the deviations, the regions being between the tool and a source of the detected gamma rays in a formation around the well.

A method 2 can include elements of method 1 and can include determining deviation of energy spectra to include determining differences between energy spectra of the detected gamma rays in two different energy windows.

A method 3 can include elements of any of methods 1-2 and can include determining one or more properties to include using a relationship between the energy spectra in different energy windows A method 4 can include elements of method 3 and elements of any of methods 1-2 and can include the energy spectra in the different energy windows being normalized by the reference energy spectra channel by channel.

A method 5 can include elements of any of methods 1-4 and can include the reference energy spectra being energy spectra measured in fresh water-filled borehole.

A method 6 can include elements of any of methods 1-5 and can include determining one or more properties to include determining borehole fluid density and annular space density.

A method 7 can include elements of any of methods 1-6 and can include determining one or more properties to include determining borehole fluid density using an index correlated to difference of normalized counting rates in different energy windows.

A method 8 can include elements of any of methods 1-7 and can include determining one or more properties to include determining annular space density using an index correlated to a ratio of normalized counting rates in different energy windows.

A machine-readable storage device 1 having instructions stored thereon, which, when executed by control circuitry of a machine, cause the machine to perform operations, the operations comprising: detecting gamma rays in a detector in a tool, the tool disposed downhole in a well; determining, via a processor, deviation of energy spectra of the detected gamma rays in each selected energy window of a set of selected energy windows with respect to a reference energy spectra of the respective selected energy window; and determining, via the processor, one or more properties of one or more regions around the tool from the deviations, the regions being between the tool and a source of the detected gamma rays in a formation around the well.

A machine-readable storage device 2 can include elements of machine-readable storage device 1 and can include determining deviation of energy spectra to include determining differences between energy spectra of the detected gamma rays in two different energy windows.

A machine-readable storage device 3 can include elements of any of machine-readable storage devices 1-2 and can include determining one or more properties to include using a relationship between the energy spectra in different energy windows.

A machine-readable storage device 4 can include elements of machine-readable storage device 3 and elements of any of machine-readable storage devices 1-2 and can include the energy spectra in the different energy windows being normalized by the reference energy spectra channel by channel.

A machine-readable storage device 5 can include elements of any of machine-readable storage devices 1-4 and can include the reference energy spectra being energy spectra measured in fresh water-filled borehole.

A machine-readable storage device 6 can include elements of any of machine-readable storage devices 1-5 and can include determining one or more properties to include determining borehole fluid density and annular space density.

A machine-readable storage device 7 can include elements of any of machine-readable storage devices 1-6 and can include determining one or more properties to include determining borehole fluid density using an index correlated to difference of normalized counting rates in different energy windows.

A machine-readable storage device 8 can include elements of any of machine-readable storage devices 1-7 and can include determining one or more properties to include determining annular space density using an index correlated to a ratio of normalized counting rates in different energy windows.

A system 1 can comprise: a tool having a detector to detect gamma rays, the tool operable downhole in a well; and a processor arranged to determine deviation of energy spectra of gamma rays detected in downhole operation of the tool in each selected energy window of a set of selected energy windows with respect to a reference energy spectra of the respective selected energy window and to determine one or more properties of one or more regions around the tool, when disposed downhole in the well, from the deviations, the regions being between the tool and a source of the detected gamma rays in a formation around the well.

A system 2 can include elements of system 1 and can include the detector being a gamma ray scintillator coupled with a photomultiplier tube or a photodiode.

A system 3 can include elements of any of systems 1-2 and can include the detector being a semiconductor detector that converts photons incident to the semiconductor detector to an electrical signal.

A system 4 can include elements of any of systems 1-3 and can include the processor arranged to determine the one or more properties by use of a relationship between the energy spectra in different energy windows.

A system 5 can include elements of system 4 and elements of any of systems 1-3 and can include the energy spectra in the different energy windows being normalized by the reference energy spectra channel by channel.

A system 6 can include elements of any of systems 1-5 and can include the reference energy spectra being energy spectra measured in fresh water-filled borehole.

A system 7 can include elements of any of systems 1-6 and can include determination of one or more properties to include a determination of borehole fluid density by use of an index correlated to difference of normalized counting rates in different energy windows.

A system 8 can include elements of any of systems 1-7 and can include determination of one or more properties to include a determination of annular space density by use of an index correlated to a ratio of normalized counting rates in different energy windows.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   detecting gamma rays in a detector in a tool, the tool disposed downhole in a well;
   determining, via a processor, deviation of energy spectra of the detected gamma rays in each selected energy window of a set of selected energy windows with respect to a reference energy spectra of the respective selected energy window; and
   determining, via the processor, one or more properties of one or more regions around the tool from the deviation of the energy spectra, the regions being between the tool and a source of the detected gamma rays in a formation around the well, wherein determining one or more properties includes determining at least one of a borehole fluid density and an annular space density.

2. The method of claim 1, wherein determining the deviation of the energy spectra includes determining differences between energy spectra of the detected gamma rays in two different energy windows.

3. The method of claim 1, wherein determining the one or more properties includes using a relationship between the energy spectra in different energy windows.

4. The method of claim 3, wherein the energy spectra in the different energy windows are normalized by the reference energy spectra channel by channel.

5. The method of claim 1, wherein the reference energy spectra is energy spectra measured in fresh water-filled borehole.

6. The method of claim 1, wherein the borehole fluid density is determined using an index correlated to difference of normalized counting rates in different energy windows.

7. The method of claim 1, wherein the annular space density is determined using an index correlated to a ratio of normalized counting rates in different energy windows.

8. A system comprising:
a tool having a detector to detect gamma rays, the tool operable downhole in a well; and
a processor arranged to
determine deviation of energy spectra of gamma rays detected in downhole operation of the tool in each selected energy window of a set of selected energy windows with respect to a reference energy spectra of the respective selected energy window, and
determine one or more properties of one or more regions around the tool, when the tool is disposed downhole in the well, from the deviation of the energy spectra, the regions being between the tool and a source of the detected gamma rays in a formation around the well,
wherein determination of one or more properties includes a determination of at least one of a borehole fluid density and an annular space density.

9. The system of claim 8, wherein the detector is a gamma ray scintillator coupled with a photomultiplier tube or a photodiode.

10. The system of claim 8, wherein the detector is a semiconductor detector that converts photons incident to the semiconductor detector to an electrical signal.

11. The system of claim 8, wherein the processor is arranged to determine the one or more properties by use of a relationship between the energy spectra in different energy windows.

12. The system of claim 11, wherein the energy spectra in the different energy windows are normalized by the reference energy spectra channel by channel.

13. The system of claim 8, wherein the reference energy spectra is energy spectra measured in fresh water-filled borehole.

14. The system of claim 8,
wherein the borehole fluid density is determined using a first index correlated to a difference of normalized counting rates in different energy windows, and
wherein the annular space density is determined using a second index correlated to a ratio of the normalized counting rates in the different energy windows.

15. A machine-readable storage device having instructions stored thereon, which, when performed by a machine, cause the machine to perform operations, the operations comprising:
determining, via a processor, deviation of energy spectra of gamma rays in each selected energy window of a set of selected energy windows with respect to a reference energy spectra of the respective selected energy window, wherein the gamma rays are detected in a detector of a tool disposed downhole in a well; and
determining, via the processor, one or more properties of one or more regions around the tool from the deviation of the energy spectra, the regions being between the tool and a source of the detected gamma rays in a formation around the well,
wherein determining one or more properties includes determining at least one of a borehole fluid density and an annular space density.

16. The machine-readable storage device of claim 15, wherein determining the deviation of the energy spectra includes determining differences between the energy spectra of the detected gamma rays in two different energy windows.

17. The machine-readable storage device of claim 15, wherein determining the one or more properties includes using a relationship between the energy spectra in different energy windows.

18. The machine-readable storage device of claim 17, wherein the energy spectra in the different energy windows are normalized by the reference energy spectra channel by channel.

19. The machine-readable storage device of claim 15, wherein the reference energy spectra is energy spectra measured in fresh water-filled borehole.

20. The machine-readable storage device of claim 15,
wherein the borehole fluid density is determined using a first index correlated to difference of normalized counting rates in different energy windows, and
wherein the annular space density is determined using a second index correlated to a ratio of the normalized counting rates in the different energy windows.

* * * * *